United States Patent
Matsa et al.

(10) Patent No.: US 8,037,124 B2
(45) Date of Patent: Oct. 11, 2011

(54) SYSTEM AND METHOD FOR DESCRIBING AND LOCATING WEB SERVICES

(75) Inventors: Moshe Morris Emanuel Matsa, Cambridge, MA (US); Ryan T. Betts, Framingham, MA (US); Eric David Perkins, Boston, MA (US)

(73) Assignee: International Business Machines Corporation, Armonk, NY (US)

( * ) Notice: Subject to any disclaimer, the term of this patent is extended or adjusted under 35 U.S.C. 154(b) by 355 days.

(21) Appl. No.: 12/328,821

(22) Filed: Dec. 5, 2008

(65) Prior Publication Data

US 2010/0146035 A1    Jun. 10, 2010

(51) Int. Cl.
*G06F 15/16* (2006.01)
(52) U.S. Cl. ......... 709/202; 709/203; 709/219; 709/230
(58) Field of Classification Search ......... None
See application file for complete search history.

(56) References Cited

U.S. PATENT DOCUMENTS

| | | | |
|---|---|---|---|
| 7,761,594 B1 * | 7/2010 | Mowat | 709/238 |
| 2004/0064503 A1 * | 4/2004 | Karakashian et al. | 709/203 |
| 2005/0198304 A1 * | 9/2005 | Oliver et al. | 709/227 |
| 2007/0022199 A1 * | 1/2007 | Tatsubori | 709/227 |
| 2007/0067473 A1 * | 3/2007 | Baikov et al. | 709/230 |

* cited by examiner

*Primary Examiner* — John B. Walsh
(74) *Attorney, Agent, or Firm* — Winstead, P.C.

(57) ABSTRACT

A system and method for describing and locating web services. The system may include a server and a proxy located at a front-end of the server. The server may have an associated Web Services Description Language (WSDL) that identifies web services on the server. The proxy may be structured to automatically construct a synthetic WSDL based on configuration metadata and the WSDL; and implement the synthetic WSDL to automatically mediate requests at the proxy to be appropriate for the WSDL at the server.

20 Claims, 3 Drawing Sheets

SYSTEM AND METHOD FOR DESCRIBING AND LOCATING WEB SERVICES

BACKGROUND

1. Technical Field

The disclosure relates generally to a system and method for describing and locating web services, and more particularly, to a system and method for describing and locating web services using synthetic Web Services Description Language (WSDL) ports for automatic proxy mediation via configuration metadata.

2. Background Art

WSDL is an interface description language, defining the syntax and protocols used for network communications. WSDL follows a hierarchical structure, with data definitions, message types, operations, ports, and services; each one building on the one before, respectively. As used herein, a port defines a set of messages and binds them to a particular transport and data syntax.

While WSDL tries to promote re-use within its different elements by using naming conventions, etc., there are still issues with verbosity and repetition when using WSDL. In particular, there is no way to determine whether a network entity can provide the same operations over multiple protocols and syntaxes. As a well-known example of this, the Internet Domain Name System (DNS) protocol is available over both User Datagram Protocol (UDP) and Transmission Control Protocol (TCP).

Furthermore, unforeseen extension of service offering can be difficult in many common cases, even where all that is desired is to provide the same pre-existing operations over additional protocols. For example, a given company might have originally implemented an industry standard WSDL that implements a Simple Object Access Protocol (SOAP) 1.1 binding based on the technology at the time. Then, with increased adoption of SOAP 1.2 in network communications, the company likely desires to make their system available to SOAP 1.2 clients as well. In the related art, to implement SOAP 1.2, the company would have to define a new WSDL file which adds SOAP 1.2 support and that includes the previous WSDL, and then add code into the company server to actually support the new binding. As understood, this coding can be quite time-consuming and expensive.

The illustrative aspects of the present disclosure are designed to solve the problems herein described and/or other problems not discussed.

BRIEF SUMMARY

A first aspect of the disclosure provides a system for describing and locating web services. The system may include a server and a proxy located at a front-end of the server. The server may have an associated Web Services Description Language (WSDL) that identifies web services on the server. The proxy may be structured to automatically construct a synthetic WSDL based on configuration metadata and the WSDL; and implement the synthetic WSDL to automatically mediate requests at the proxy to be appropriate for the WSDL at the server.

A second aspect of the disclosure provides a method of describing and locating web services. In the second aspect, the method may comprise: providing a WSDL at a server; providing configuration metadata associated with the WSDL at a front-end of the server; automatically constructing a synthetic WSDL based on the configuration metadata and the WSDL; and implementing the synthetic WSDL to automatically mediate requests at the front-end to be appropriate for the WSDL at the server.

A third aspect of the disclosure provides a program product stored on a computer readable medium, which when executed, describes and identifies web services. In the third aspect, the program product may include: program code associated with a WSDL that identifies web services on a server; program code for automatically constructing a synthetic WSDL based on configuration metadata and the WSDL; and program code for implementing the synthetic WSDL to automatically mediate requests at a proxy to be appropriate for the WSDL at the server.

A fourth aspect of the disclosure provides a method of generating a system for describing and identifying web services, the method comprising: providing a computer infrastructure; and for each of the steps of any other method of the invention, deploying a means for performing the steps to the computer infrastructure.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION

Figure 1:
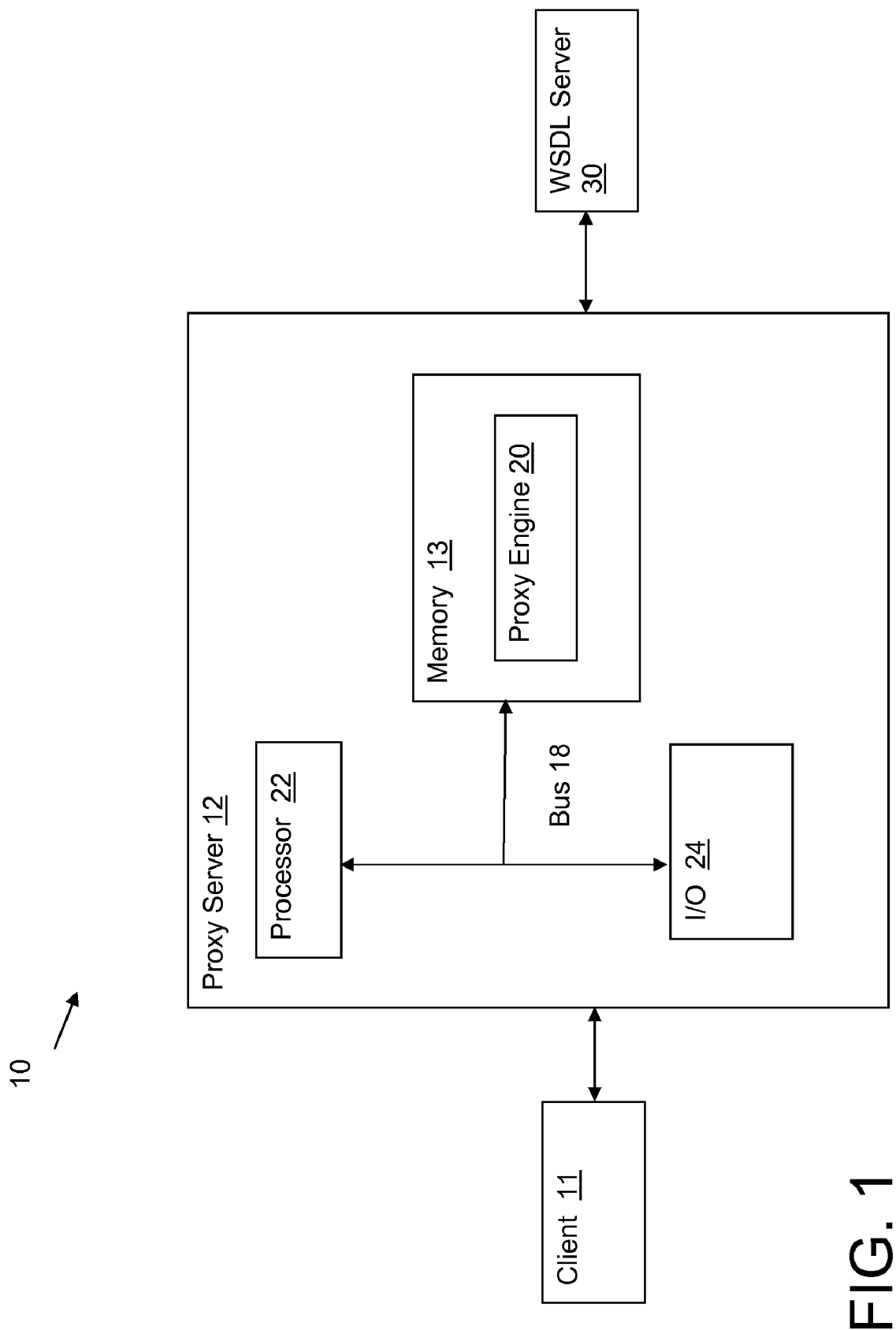
FIG. 1 shows a system for describing and locating web services using a web proxy server according to an illustrative embodiment of the present invention.

As indicated above, the disclosure provides a system and method for describing and locating web services. FIG. 1 shows an illustrative embodiment of a system 10 for describing and locating web services using a web proxy server. The illustrative system 10 includes a client 11, a proxy server 12 having a proxy engine 20 stored in memory 13, and a Web Services Description Language (WSDL) server 30.

The client 11 may include any computer architecture that will enable the client 11 to communicate in a network by receiving and sending signals, such as a mainframe computer, desktop computer, Personal Digital Assistant (PDA), a cellular phone, a handheld computer, a Voice over Internet Protocol (VoIP) station, etc.

Proxy server 12 may include a processor 22, an input/output (I/O) 24, and a memory 13 for storing proxy engine 20 (e.g., as a program product that can be executed by processor 22). As is known in the art, in general, processor 22 executes computer program code that is stored in memory 13. While executing computer program code, processor 22 can read and/or write data, such as configuration metadata or WSDL data, to/from memory 13, and/or I/O interface 24. Bus 18 provides a communications link between each of the components in proxy server 12. I/O device 24 can comprise any device that enables a user to interact with proxy server 12 or any device that enables proxy server 12 to communicate with one or more other computing devices. Input/output devices (including but not limited to keyboards, displays, pointing devices, etc.) can be coupled to the system either directly or through intervening I/O controllers.

In any event, proxy server 12 can comprise any general purpose computing article of manufacture capable of executing computer program code installed by a user (e.g., a personal computer, server, handheld device, etc.). However, it is understood that proxy server 12 is only representative of various possible equivalent computing devices that may perform the various process steps of the disclosure. To this extent, in other embodiments, proxy server 12 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively.

It should be noted that while the proxy described in the illustrative embodiment of the invention shown in FIG. 1 is embodied as a server 12, separate from the client 11 and the WSDL server 30, the proxy could be among others, (1) co-located on the same machine as the client, (2) on the same machine as the WSDL server, (3) on the same machine as both the client and WSDL server, and/or (4) on a separate machine as shown.

Similarly, system 10 is only illustrative of various types of computer infrastructures for implementing the disclosure. For example, in one embodiment, system 10 comprises two or more computing devices (e.g., a server cluster) that communicate over any type of wired and/or wireless communications link, such as a network, a shared memory, or the like, to perform the various process steps of the disclosure. When the communications link comprises a network, the network can comprise any combination of one or more types of networks (e.g., the Internet, a wide area network, a local area network, a virtual private network, etc.). Network adapters may also be coupled to the system to enable the data processing system to become coupled to other data processing systems or remote printers or storage devices through intervening private or public networks. Modems, cable modems and Ethernet cards are just a few of the currently available types of network adapters. Regardless, communications between the computing devices may utilize any combination of various types of transmission techniques.

It is understood that some of the various systems shown in FIG. 1 can be implemented independently, combined, and/or stored in memory for one or more separate computing devices that are included in system 10. Further, it is understood that some of the systems and/or functionality may not be implemented, or additional systems and/or functionality may be included as part of system 10.

Referring again to FIG. 1, the WSDL server 30 may also include any computer architecture that will enable the WSDL server 30 to communicate in a network by receiving and sending signals. The WSDL server 30, may for example, include an industry standard WSDL that implements a Simple Object Access Protocol (SOAP) binding, such as SOAP 1.1.

Figure 2:
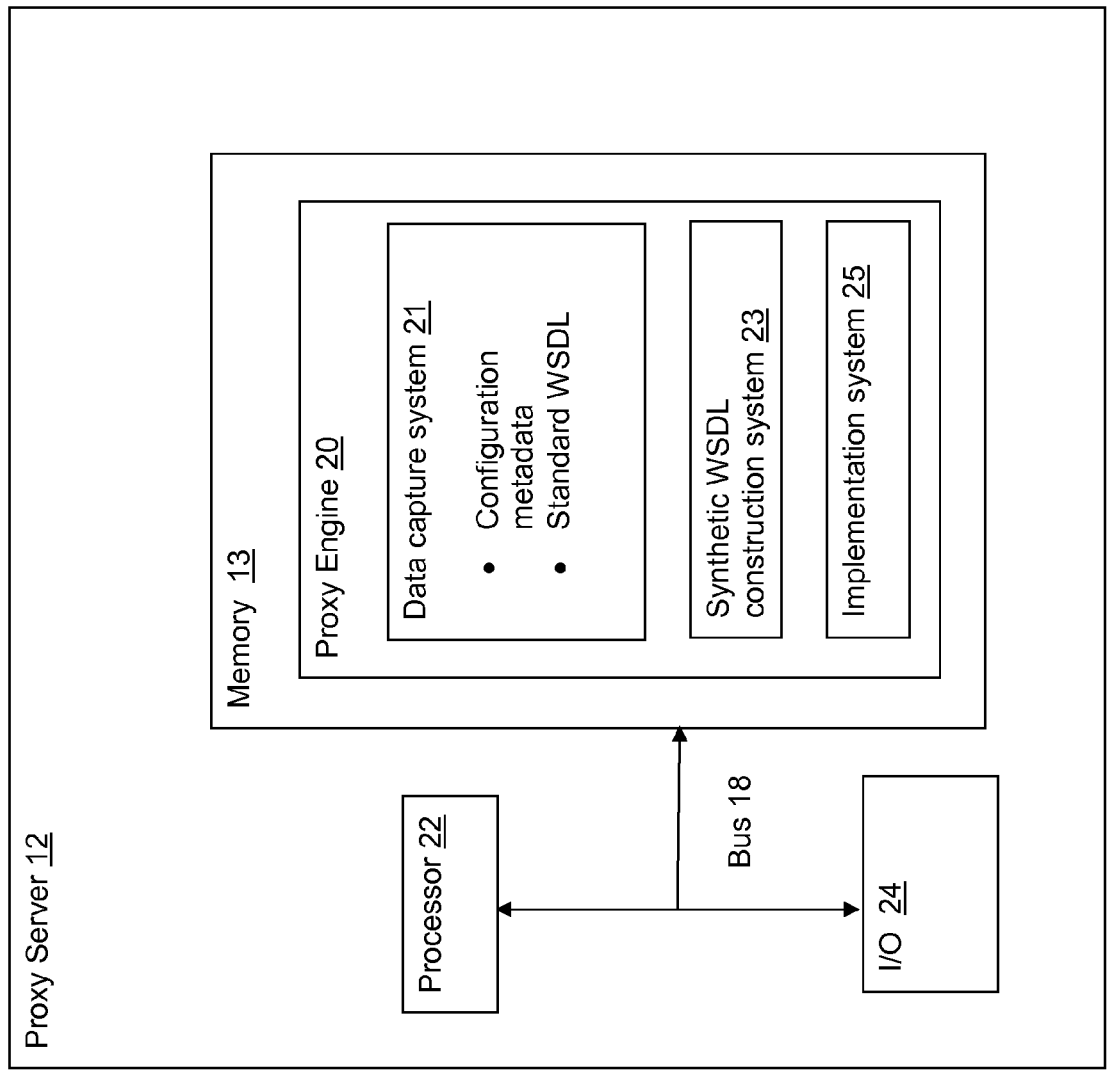
FIG. 2 shows a web proxy server according to an illustrative embodiment of the invention.

As shown in detail in FIG. 2, the proxy engine 20 may include a data capture system 21, a synthetic WSDL construction system 23, and an implementation system 25. In an illustrative embodiment of the invention, the proxy server 12 in front of the WSDL server 30 is given configuration metadata that goes along with the standard WSDL implemented on WSDL server 30. The configuration metadata is obtained by data capture system 21. The configuration metadata may specify a list of pairs, each pair including two items, the first item being a reference to a port in the "standard" backend WSDL, and the second item being a protocol to be supported.

Using the configuration metadata, protocols to be supported, and information about the standard WSDL, a new, synthetic WSDL may be automatically constructed by the proxy synthetic WSDL construction system 23.

The proxy engine 20 may then implement the new, synthetic WSDL via the implementation system 25, automatically mediating all requests from the client 11 to be appropriate for the standard WSDL which WSDL server 30 (the backend server) already supported. As an example, the standard WSDL file may include a wsdl:definitions/wsdl:service tree such as:

```
<service name="ExampleCompanySoapRpcLitTestSvc">
    <port name="Soap12TestRpcLitPort"
 binding="tns:Soap12TestRpcLitBinding">
        <soap12:address location="http://
            www.ExampleCompany.net/
    soap12/test-rpc-lit"/>
    </port>
</service>
```

Then, the metadata configuration information may include the following list of pairs:

```
{ExampleCompanyTargetNamespace, Soap12TestRpcLitPort},
http://schemas.xmlsoap.org/wsdl/soap12/
{ExampleCompanyTargetNamespace, Soap12TestRpcLitPort},
http://schemas.xmlsoap.org/wsdl/soap/
```

The first pair of the metadata configuration information above (lines 1-2) names the definitions/service/port and indicates that it should accept the soap 12 binding as specified in the WSDL. The second pair (lines 3-4) names the same definitions/service/port and indicates that it should also accept the soap 11 binding, which is not in the WSDL. The new, "effective" WSDL file, using the WSDL with the extra configuration metadata, would include the following wsdl:definitions/wsdl:service tree:

```
<service name="ExampleCompanySoapRpcLitTestSvc">
    <port name="Soap12TestRpcLitPort"
 binding="tns:Soap12TestRpcLitBinding">
        <soap12:address location="http://
            www.ExampleCompany.net/
    soap12/test-rpc-lit"/>
    </port>
    <port name="Soap12TestRpcLitPort_Soap11"
    binding="tns:Soap11TestRpcLitBinding">
        <soap11:address location="http://www.ExampleCompany.net/
    soap12/test-rpc-lit"/>
    </port>
</service>
```

Then, since a "real" port is the only one to be supported by WSDL server 30 (the backend server), an attribute can be added indicating the mediation required by the proxy engine 20, to construct a synthetic WSDL:

```
<service name="ExampleCompanySoapRpcLitTestSvc">
    <port name="Soap12TestRpcLitPort"
binding="tns:Soap12TestRpcLitBinding">
        <soap12:address location="http://
        www.ExampleCompany.net/
soap12/test-rpc-lit"/>
    </port>
    <port name="Soap12TestRpcLitPort_Soap11"
binding="tns:Soap11TestRpcLitBinding"
        ext:backside-port="tns:Soap12TestRpcLitPort" >
        <soap11:address location="http://www.ExampleCompany.net/
soap12/test-rpc-lit"/>
    </port>
</service>
```

With the above as the synthetic WSDL that is seen in all processing locations—client 11, proxy server 12, and WSDL server 30, the client 11 knows that it can send a SOAP 1.1 request automatically to a SOAP 1.2 request, and back from SOAP 1.2 to SOAP 1.1 for the response when necessary, based on the request. Furthermore, the WSDL server 30 only needs to implement the actual industry WSDL and SOAP 1.2. Yet, with just a single line of metadata configuration, or a checkbox in a graphical user interface (GUI), the client 11 may also use a supported SOAP 1.1 port.

Further, once these synthetic ports are available, this information can be used by any of the client 11, WSDL server 30, or intermediaries on either side to perform mediation. The semantics of the operations defined in the original port and its synthetic port are identical, which enables mediation without any semantic knowledge at all points in the WSDL pipeline. Of course, the invention is not limited to this port arrangement, and in other embodiments, the invention could limit the synthetic WSDL to non-"real" ports, for example.

Figure 3:
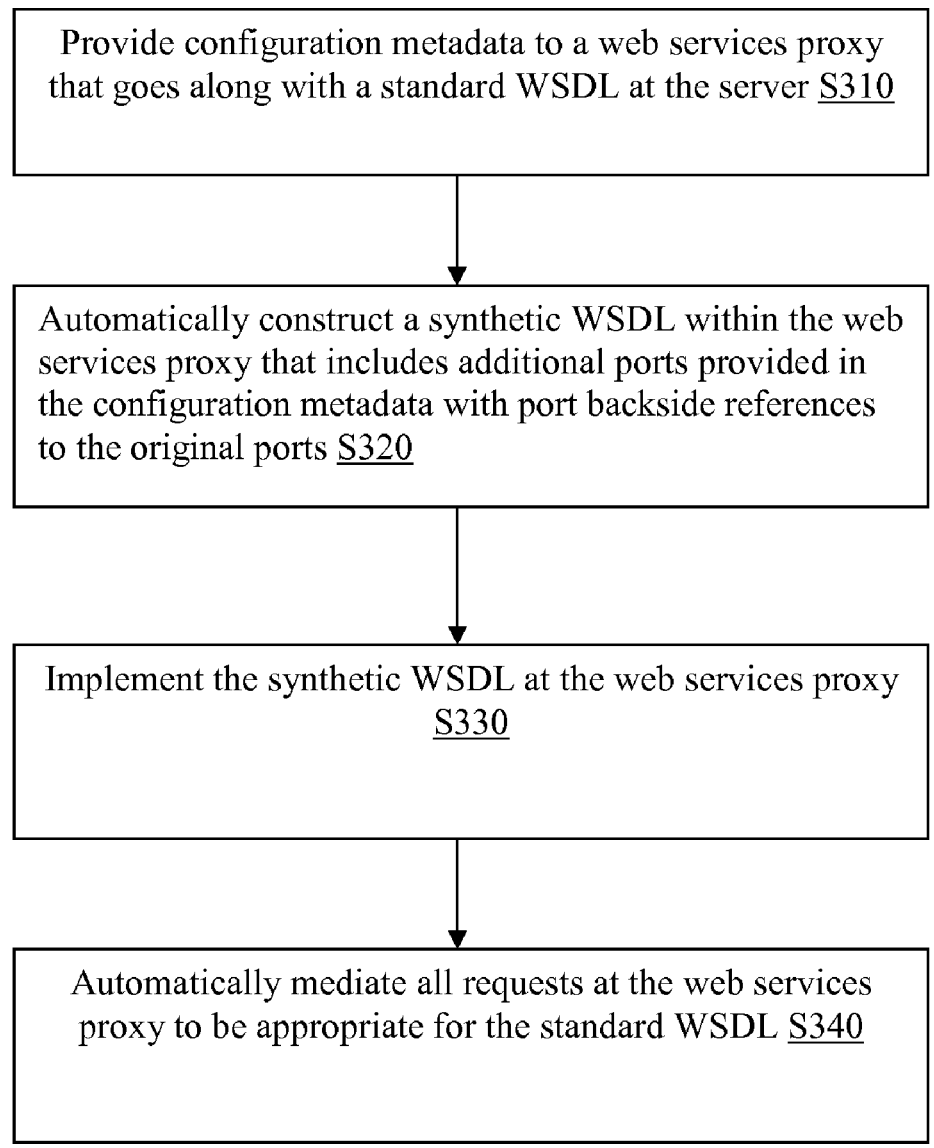
FIG. 3 shows a method of describing and locating web services according to an illustrative embodiment of the present invention.

FIG. 3 shows a method of describing and locating web services according to an illustrative embodiment of the present invention. In Step 310, a web services proxy that is positioned in front of a server (a backend server) is given configuration metadata that goes along with a standard WSDL at the server. The configuration metadata may specify a list of pairs, and each pair includes two items, the first being a reference to a port in the "standard" backend WSDL, and the second being a protocol to be supported. In Step 320, a new, synthetic WSDL is automatically constructed within the web services proxy that includes these additional ports provided in the configuration metadata with port backside references to the original ports. In Step 330, the web services proxy then implements the new, synthetic WSDL. Finally, in Step 340, the web services proxy automatically mediates all requests on the frontend to be appropriate for the standard WSDL that the backend server already supported.

As will be appreciated by one skilled in the art, the present invention may be embodied as a system, method or program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages, or machine code. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described above with reference to flowchart illustrations and/or block diagrams of methods, systems and program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A method of describing and locating web services, the method comprising:
    providing a Web Services Description Language (WSDL) at a server;
    providing configuration metadata associated with the WSDL at a front-end of the server;
    automatically constructing a synthetic WSDL based on the configuration metadata and the WSDL; and
    implementing, by a processor, the synthetic WSDL to automatically mediate requests at the front-end to be appropriate for the WSDL at the server.

2. The method as claimed in claim 1, wherein the front-end of the server is a web-services proxy that includes a proxy engine for constructing the synthetic WSDL.

3. The method as claimed in claim 1, wherein the configuration metadata specifies a list of pairs, at least one of the pairs including two items, a first item being a reference to a port in the WSDL, and a second item being a protocol to be supported.

4. The method as claimed in claim 3, further comprising using a graphical user interface of the WSDL, which includes a graphical representation of the port with a check box representing the protocol to be supported, wherein the check box being checked corresponds to the at least one of the pairs.

5. The method as claimed in claim 3, wherein the synthetic WSDL includes for each pair in the list of pairs, a synthetic port which has a similar configuration as the port in the WSDL, and supports the protocol to be supported.

6. The method as claimed in claim 5, wherein semantics of operations defined in the WSDL port are the same as semantics of operations defined in the synthetic port.

7. The method as claimed in claim 1, wherein the synthetic WSDL is available for use by a client, the server, or intermediaries between the client and the server used to perform mediation between the client and the server.

8. The method as claimed in claim 1, wherein the WSDL implements a port with a SOAP 1.1 binding.

9. The method as claimed in claim 8, wherein the synthetic WSDL includes the WSDL and a port with a SOAP 1.2 binding.

10. A program product stored on a computer readable storage medium, which when executed, describes and identifies web services, the program product comprising:
    program code associated with a WSDL that identifies web services on a server;
    program code for automatically constructing a synthetic WSDL based on configuration metadata and the WSDL; and
    program code for implementing the synthetic WSDL to automatically mediate requests at a proxy to be appropriate for the WSDL at the server.

11. The program product as claimed in claim 10, wherein the configuration metadata specifies a list of pairs, at least one of the pairs including two items, a first item being a reference to a port in the WSDL, and a second item being a protocol to be supported.

12. The program product as claimed in claim 11, wherein the program code constructs the synthetic WSDL to include for each pair in the list of pairs, a synthetic port which has a similar configuration as the port in the WSDL, and supports the protocol to be supported.

13. The program product as claimed in claim 12, wherein the program code constructs the synthetic WSDL such that semantics of operations defined in the WSDL port are the same as semantics of operations defined in the synthetic port.

14. The program product as claimed in claim 10, wherein the program code constructs the synthetic WSDL to be available for use by a client, the server, or intermediaries between the client and the server used to perform mediation between the client and the server.

15. The program product as claimed in claim 10, wherein the program code constructs the synthetic WSDL to include the WSDL and a port with a SOAP 1.2 binding.

16. A system for describing and locating web services, the system comprising:
    a server including an associated WSDL that identifies web services on the server;
    a proxy, having a processor, located at a front-end of the server, the proxy structured to:
        automatically construct a synthetic WSDL based on configuration metadata and the WSDL; and
        implement the synthetic WSDL to automatically mediate requests at the proxy to be appropriate for the WSDL at the server.

17. The system as claimed in claim 16, wherein the configuration metadata specifies a list of pairs, at least one of the pairs including two items, a first item being a reference to a port in the WSDL, and a second item being a protocol to be supported.

18. The system as claimed in claim 17, wherein the synthetic WSDL includes for each pair in the list of pairs, a synthetic port which has a similar configuration as the port in the WSDL, and supports the protocol to be supported.

19. The system as claimed in claim 18, wherein semantics of operations defined in the WSDL port are the same as semantics of operations defined in the synthetic port.

20. A method of generating a system for describing and identifying web services, the method comprising:
   providing a computer infrastructure being operable to:
      provide a Web Services Description Language (WSDL) at a server;
      provide configuration metadata associated with the WSDL at a front-end of the server;
      automatically construct a synthetic WSDL based on the configuration metadata and the WSDL; and
   implement, by a processor, the synthetic WSDL to automatically mediate requests at the front-end to be appropriate for the WSDL at the server.

\* \* \* \* \*